UNITED STATES PATENT OFFICE.

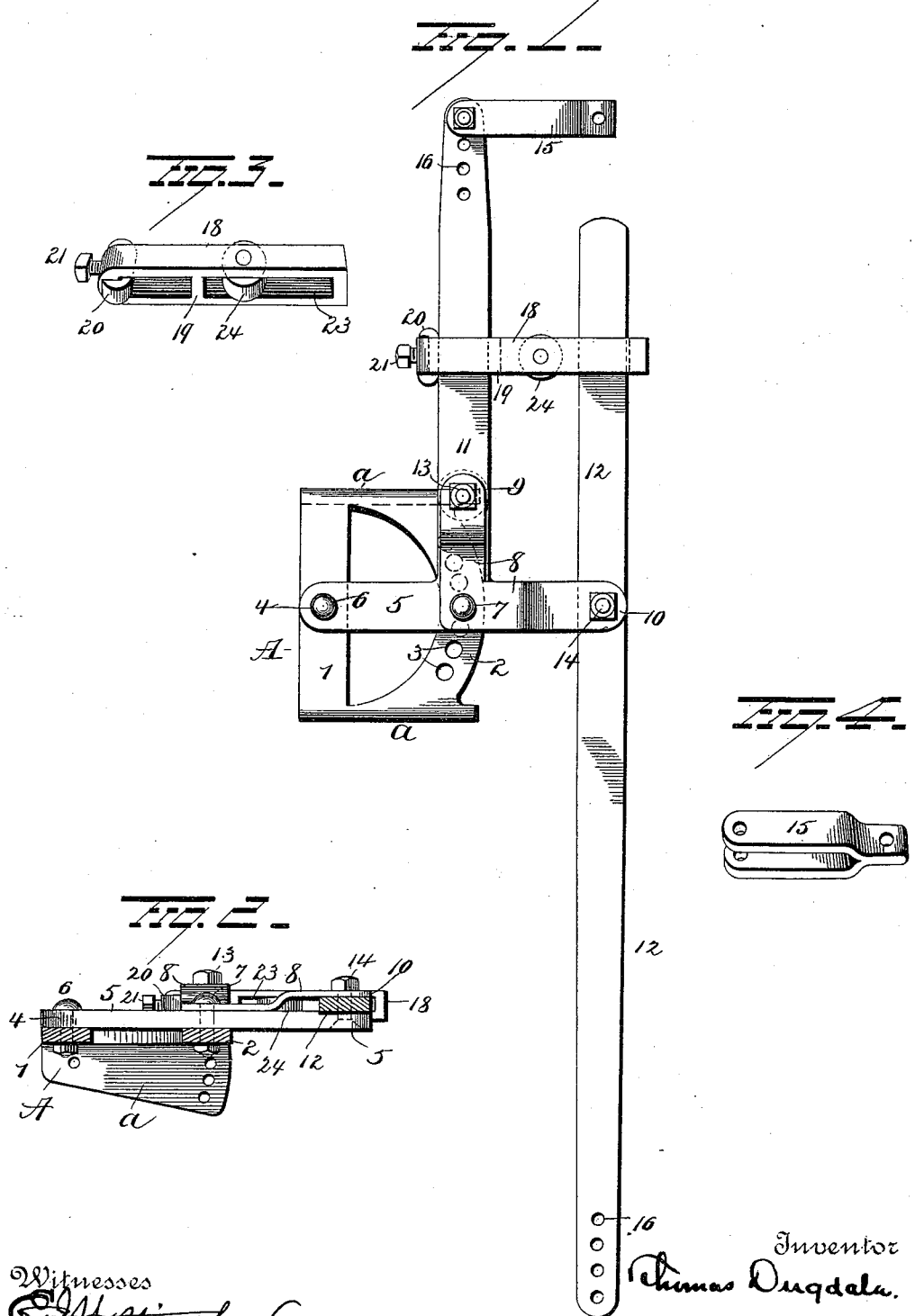

THOMAS DUGDALE, OF SOUTH BEND, INDIANA, ASSIGNOR TO THE SOUTH BEND IRON WORKS, OF SAME PLACE.

DRAFT-EQUALIZER.

SPECIFICATION forming part of Letters Patent No. 438,725, dated October 21, 1890.

Application filed September 6, 1890. Serial No. 364,100. (No model.)

*To all whom it may concern:*

Be it known that I, THOMAS DUGDALE, of South Bend, in the county of St. Joseph and State of Indiana, have invented certain new and useful Improvements in Horse-Equalizers; and I do hereby declare the following to be a full, clear, and exact description of the invention, such as will enable others skilled in the art to which it appertains to make and use the same.

My invention relates to an improvement in draft-equalizers, the object being to provide for a perfect equalization of the draft and to provide for the width of cut of the plow; and with this end in view my invention consists in a pair of equalizing-bars arranged out of alignment with each other and having sliding connection with each other, and pivotal connection with the attachment by which the draft-equalizer is connected to the plow or other article to be drawn.

It further consists in certain novel features for the adjustment of the various parts and in arrangements of features and combinations of parts, as will be hereinafter described, and pointed out in the claims.

In the accompanying drawings, Figure 1 is a plan view of my improved equalizer. Fig. 2 is a section. Fig. 3 is a detached view of the adjustable loop, and Fig. 4 is a detached view of the link.

A represents a clevis or other attaching device, by means of which the equalizer is secured to the plow-beam or other object to be drawn. This consists of the side pieces *a a*, by which the attachment at different inclinations is effected, and the cross-bars 1 and 2, the latter of which is provided with several holes 3 3, extending in the arc of a circle, and the former with one central hole 4. A T-shaped draft-bar 5 is held to the clevis by means of two bolts or pins 6 and 7, the former serving to adjust the equalizer relative to the plow to regulate the cut of the latter and the other acting as a pivot for the bar when it is laterally adjusted. An L-shaped plate 8 is superposed over the outer end of the T-shaped bar, and the ends of this plate terminate in the clevises 9 and 10. The equalizing-bars 11 and 12 are connected pivotally with these clevises, the former at its inner end to the clevis 9 and the latter some distance from its ends to clevis 10 by bolts or pins 13 and 14, respectively. Thus in this connection it may be observed that the two bars are out of alignment with each other, bar 11 being back of bar 12, as shown, and pivoted nearly at the same point. To compensate for this and throw the furrow-team as far forward as the other team, a link 15 is pivotally connected with the outer end of bar 11. Both the bars 11 and 12 are furnished at their outer ends with several holes 16 16 for convenience in the application of the draft.

To adjust the equalizer for the purpose of making the draft-animals pull evenly, a loop 18 is provided. This is composed of a pair of plates secured together at their ends and at point 19 between the ends. The smaller space is adapted to receive the equalizing-bar 11 and a block 20. A set-screw 21 is provided for setting and holding this loop at different points on the bar to equalize the draft, for by means of it the draft may be perfectly equalized and changed, so that each draft-animal will pull alike. The larger opening 23 in the loop is adapted to receive one end of the equalizing-bar 12, and as the latter has an endwise movement through this opening with the motions of the equalizer an anti-friction roller 24 is provided for it to operate upon.

Changes in the loop—such as the employment of a cam in lieu of the roller—as well as in the other parts of the construction may of course be made, so long as I do not depart from the spirit and scope of my invention, and hence I do not wish to be limited to the exact construction hereinafter set forth; but, Having fully described my invention, what I claim as new, and desire to secure by Letters Patent, is—

1. In a draft-equalizer, the combination, with an attachment, of a pair of equalizing-bars pivotally connected to the attachment, having sliding connection with each other and located out of alignment with each other, substantially as set forth.

2. The combination, with a clevis or other attachment, of a pair of equalizing-bars pivotally connected with the clevis or attachment and an adjustable loop for loosely connecting these bars, substantially as set forth.

3. The combination, with a clevis or other attachment, of a pair of equalizing-bars pivoted to the clevis or attachment, one at its end and the other some distance from the ends, and a loop adjustably secured to the former bar through which one end of the other bar extends loosely, substantially as set forth.

4. The combination, with a clevis, a T-shaped draft-bar adjustably secured to the latter, and an L-shaped staple-plate, of a pair of equalizing-bars pivotally secured to the clevis and a loop adjustably secured to one bar and arranged to receive the other, substantially as set forth.

In testimony whereof I have signed this specification in the presence of two subscribing witnesses.

THOMAS DUGDALE.

Witnesses:
F. C. NIPPOLD,
M. M. MATTHEWS.